US012722472B2

(12) United States Patent
Kugimachi et al.

(10) Patent No.: US 12,722,472 B2
(45) Date of Patent: Sep. 1, 2026

(54) HYBRID ELECTRIC VEHICLE

(71) Applicant: TOYOTA JIDOSHA KABUSHIKI KAISHA, Toyota (JP)

(72) Inventors: Yuta Kugimachi, Nagakute (JP); Hirofumi Kamishima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/202,363

(22) Filed: May 8, 2025

(65) Prior Publication Data

US 2026/0001391 A1 Jan. 1, 2026

(30) Foreign Application Priority Data

Jun. 27, 2024 (JP) ................................ 2024-104090

(51) Int. Cl.

*B60K 6/40* (2007.10)
*B60K 6/24* (2007.10)
*B60K 6/28* (2007.10)
*B60K 6/547* (2007.10)
*B60K 11/02* (2006.01)
*B60K 13/04* (2006.01)

(52) U.S. Cl.

CPC ................. *B60K 6/40* (2013.01); *B60K 6/24* (2013.01); *B60K 6/28* (2013.01); *B60K 6/547* (2013.01); *B60K 11/02* (2013.01); *B60K 13/04* (2013.01)

(58) Field of Classification Search

CPC ... B60K 6/40; B60K 6/24; B60K 6/28; B60K 6/547; B60K 11/02; B60K 13/04
See application file for complete search history.

(56) References Cited

U.S. PATENT DOCUMENTS

2015/0129345 A1* 5/2015 Suzuki ..................... B60K 6/36 903/951
2019/0232776 A1* 8/2019 Matsuda .................. B60K 6/40
2019/0367004 A1 12/2019 Kim et al.
2020/0240512 A1* 7/2020 Yashiro .................... F01M 5/00
2021/0061131 A1* 3/2021 Katayama ............... B60L 58/26
2021/0394606 A1 12/2021 Furukawa et al.
2022/0126672 A1* 4/2022 Hoshi ...................... B60K 6/24
2022/0234567 A1* 7/2022 Yokoyama ......... G01C 21/3415
2023/0146341 A1* 5/2023 Nakawatari ......... F16H 57/0412 180/339
2024/0175488 A1* 5/2024 Yanagihara ......... F16H 57/0426
2024/0384676 A1* 11/2024 Doran ..................... B60L 1/003

FOREIGN PATENT DOCUMENTS

JP 2008-155829 A 7/2008

* cited by examiner

*Primary Examiner* — Farhana Pervin
(74) *Attorney, Agent, or Firm* — Sughrue Mion, PLLC

(57) ABSTRACT

A hybrid electric vehicle includes a transaxle, a cooling circuit, and exhaust pipes. The cooling circuit includes coolant piping and regulates the temperature of the transaxle. The exhaust pipes are connected to the engine at a position forward of the driver's seat and the passenger seat, and extend to a position rearward of the transaxle. The transaxle is disposed rearward of the driver's seat and the passenger seat and between the exhaust pipes in the vehicle width direction. The cooling circuit is disposed rearward of the driver's seat and the passenger seat. The coolant piping is routed above the exhaust pipes.

9 Claims, 3 Drawing Sheets

HYBRID ELECTRIC VEHICLE

CROSS-REFERENCE TO RELATED APPLICATIONS

This application is based upon and claims the benefit of priority from Japanese Patent Application No. 2024-104090, filed on Jun. 27, 2024, the entire contents of which are incorporated herein by reference.

BACKGROUND

1. Field

The present disclosure relates to a hybrid electric vehicle.

2. Description of Related Art

Japanese Laid-Open Patent Publication No. 2008-155829 discloses a hybrid electric vehicle. The hybrid electric vehicle is a three-seater sports car.

Sports car type vehicles are desired to have high acceleration performance. In addition, after the vehicle is started, it is desirable that the onboard devices be warmed up efficiently.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a hybrid electric vehicle includes an engine, a transaxle, a cooling circuit, multiple exhaust pipes, a driver's seat, and a passenger seat. The transaxle includes a motor-generator configured to assist a rotation output of the engine, a speed change mechanism configured to change a speed of rotation transmitted from the engine, and a differential gear configured to distribute the rotation to right and left rear wheels. The speed of the rotation have been changed by the speed change mechanism. The cooling circuit includes coolant piping through which coolant flows. The cooling circuit is configured to regulate a temperature of the transaxle. Multiple exhaust pipes configured to discharge exhaust gas of the engine to outside. The engine is disposed forward of the driver's seat and the passenger seat. The exhaust pipes are connected to the engine at a position forward of the driver's seat and the passenger seat, and extend to a position rearward of the transaxle. The transaxle is disposed rearward of the driver's seat and the passenger seat and between the exhaust pipes in a vehicle width direction. The cooling circuit is disposed rearward of the driver's seat and the passenger seat. The coolant piping is routed above the exhaust pipes.

Other features and aspects will be apparent from the following detailed description, the drawings, and the claims.

BRIEF DESCRIPTION OF THE DRAWINGS

FIG. 3 is a schematic diagram showing a transaxle included in the hybrid electric vehicle of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A hybrid electric vehicle 100 according to an embodiment will now be described with reference to FIGS. 1 to 4.

Figure 1:
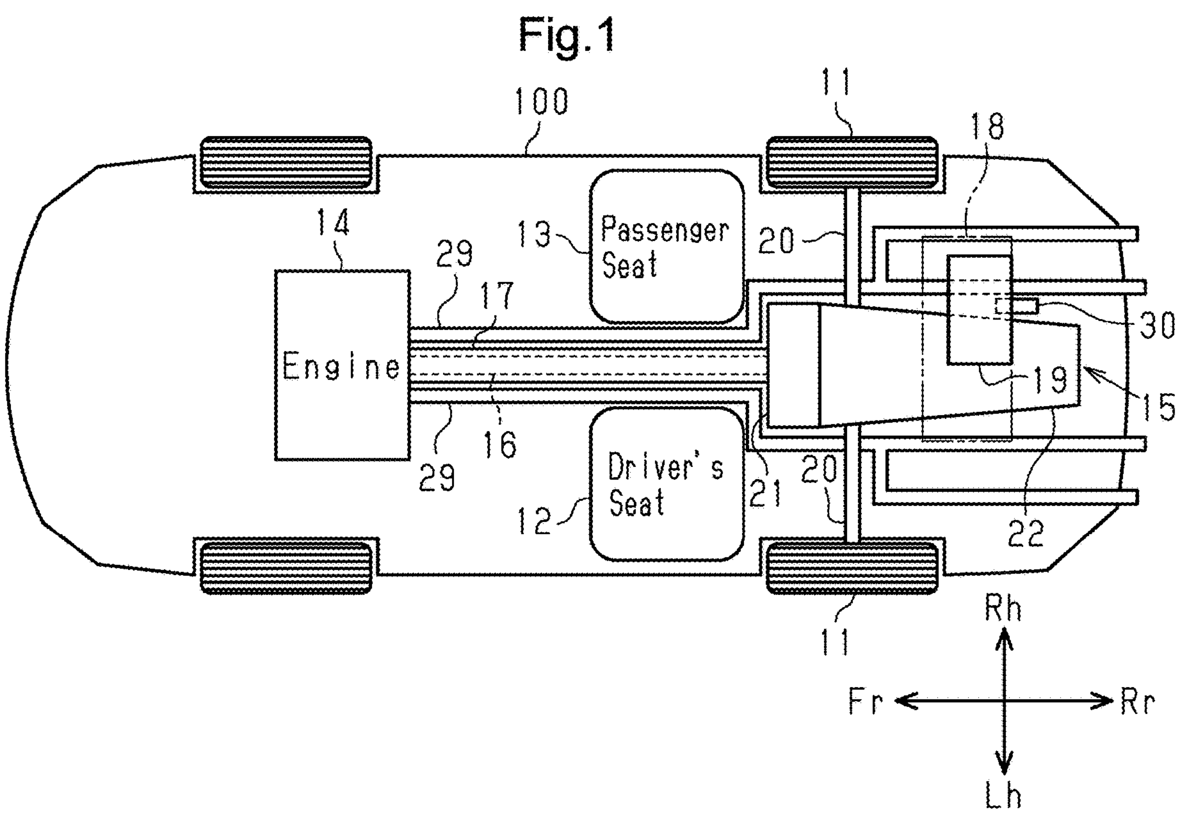
FIG. 1 is a schematic diagram of an arrangement of a propeller shaft and devices around the propeller shaft when a hybrid electric vehicle according to an embodiment is viewed from above.
Figure 3:
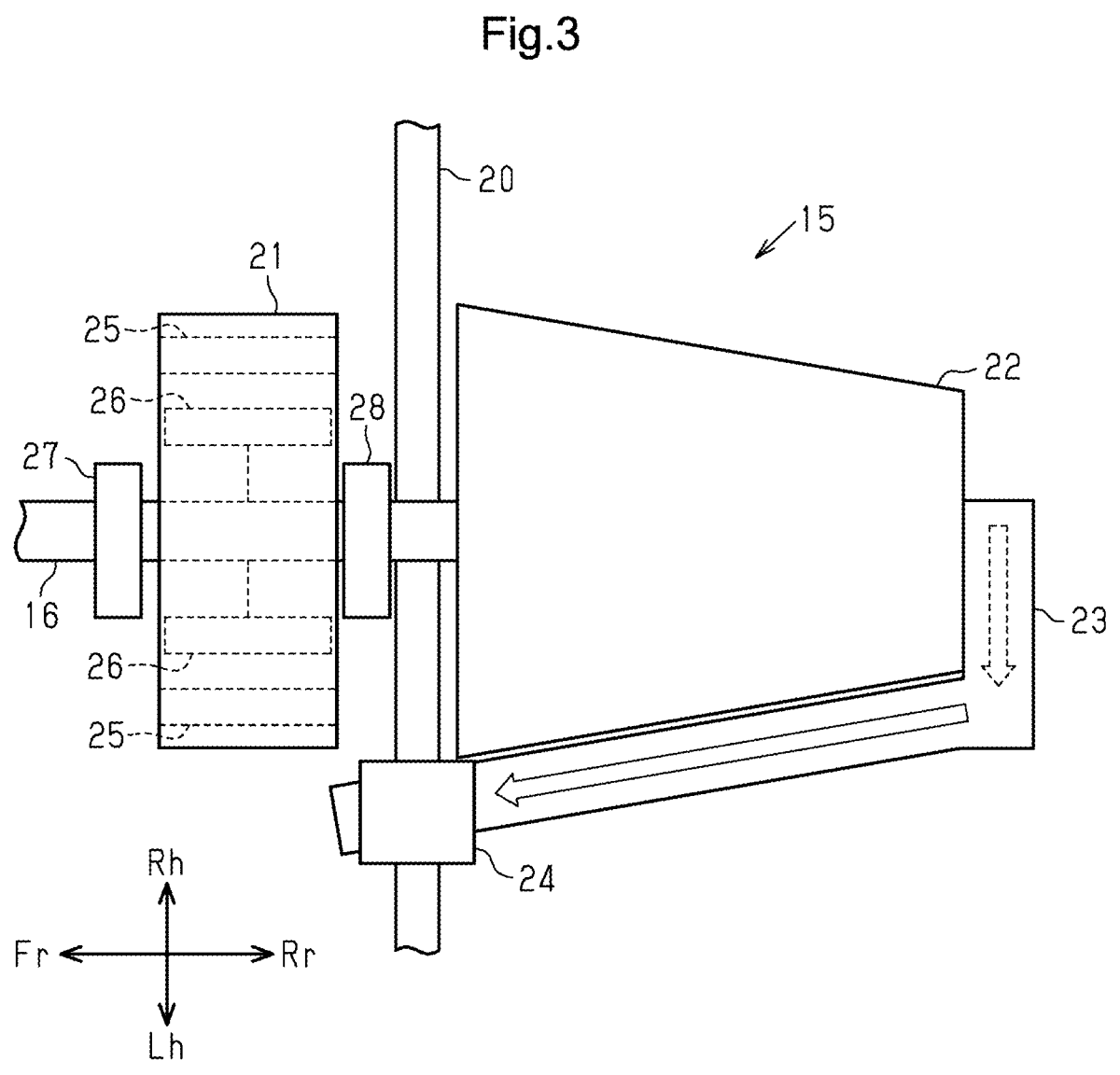
Figure 4:
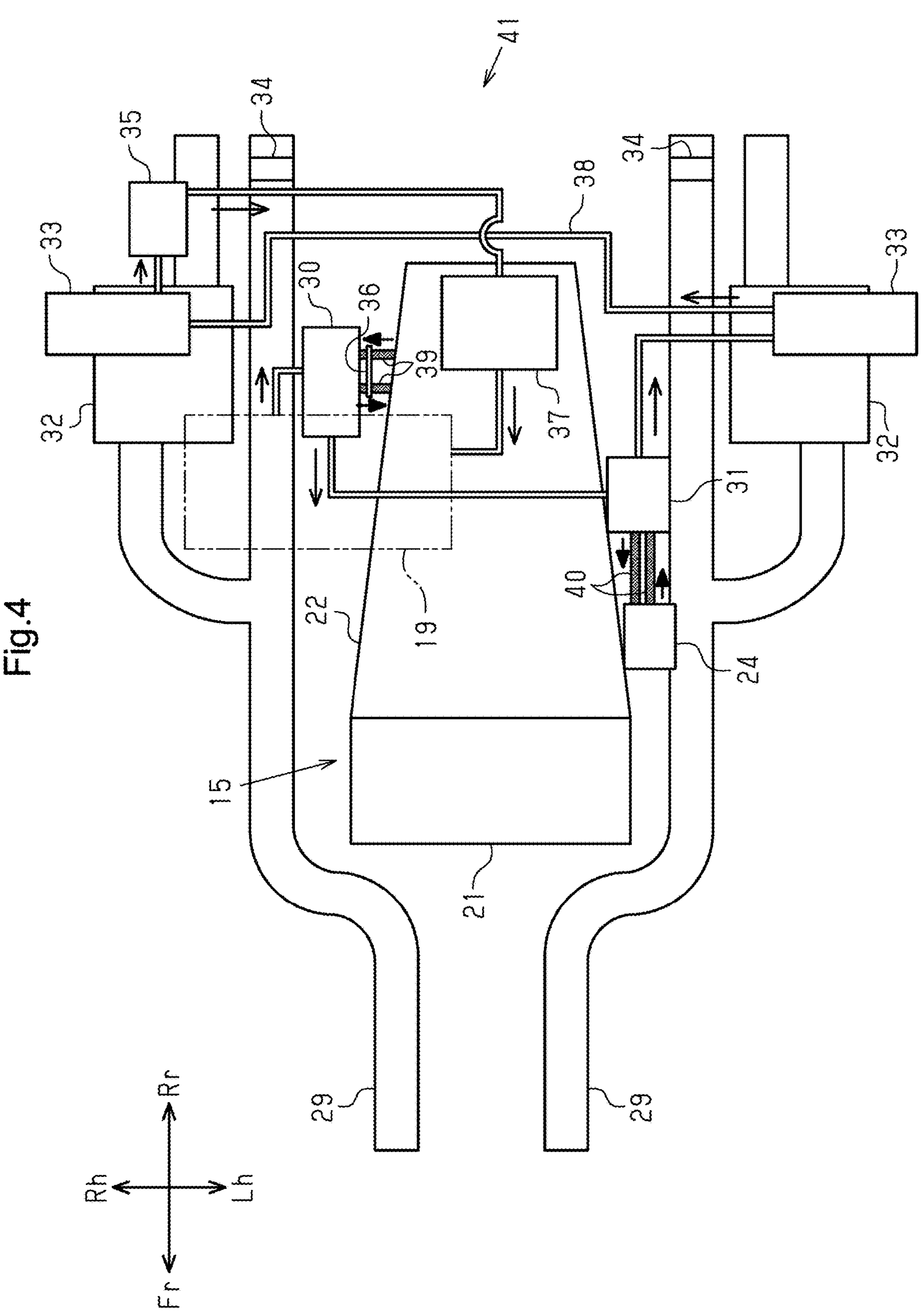
FIG. 4 is a schematic diagram showing a cooling circuit included in the hybrid electric vehicle of FIG. 1.

In the following description, terms related to orientations or directions, such as front, rear, upper, lower, right, and left, are defined based on the hybrid electric vehicle 100. In FIGS. 1 to 4, Fr indicates the front direction of the hybrid electric vehicle 100. In FIGS. 1 to 4, Rr indicates the rear direction of the hybrid electric vehicle 100. In FIGS. 1, 3 and 4, Rh indicates the right side as viewed from an occupant facing forward in the hybrid electric vehicle 100. In FIGS. 1, 3 and 4, Lh indicates the left side as viewed from an occupant facing forward in the hybrid electric vehicle 100.

Arrangement of Devices Around a Propeller Shaft 16

Figure 2:
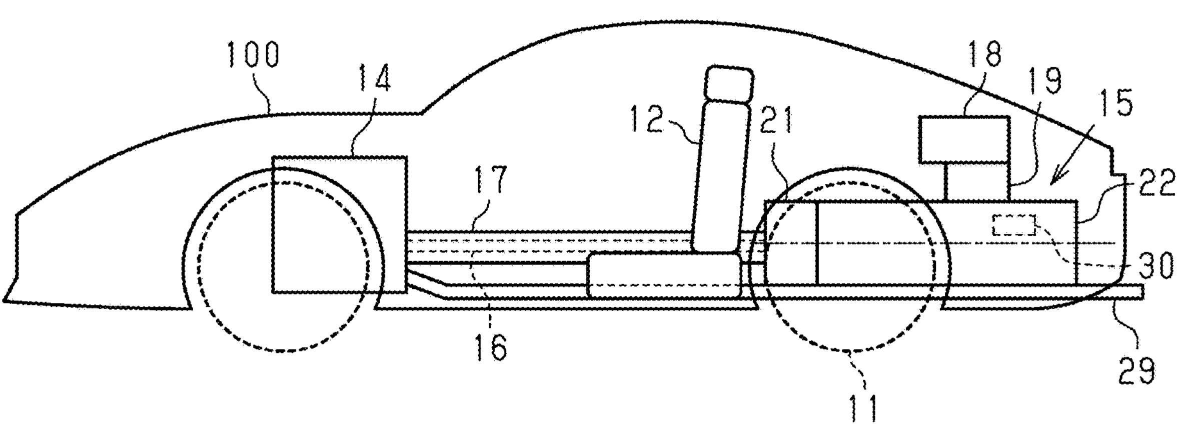
FIG. 2 is a schematic diagram showing an arrangement of a propeller shaft and multiple devices around the propeller shaft when the hybrid electric vehicle of FIG. 1 is viewed from the side.

FIG. 1 shows an arrangement of the propeller shaft 16 and devices around the propeller shaft 16 when the hybrid electric vehicle 100 is viewed from above. FIG. 2 shows the arrangement of the propeller shaft 16 and the devices around the propeller shaft 16 when the hybrid electric vehicle 100 in FIG. 1 is viewed from the left side.

The hybrid electric vehicle 100 includes the engine 14. As shown in FIGS. 1 and 2, the engine 14 is disposed forward of a driver's seat 12 and a passenger seat 13.

The hybrid electric vehicle 100 includes a transaxle 15. As shown in FIGS. 1 and 2, the transaxle 15 is disposed rearward of the driver's seat 12 and the passenger seat 13.

The hybrid electric vehicle 100 includes a propeller shaft 16. As shown in FIGS. 1 and 2, the propeller shaft 16 extends between the driver's seat 12 and the passenger seat 13, and connects the engine 14 to the transaxle 15. The propeller shaft 16 transmits rotation output of the engine 14 to the transaxle 15.

The hybrid electric vehicle 100 includes a torque tube 17. The torque tube 17 houses the propeller shaft 16. As shown in FIGS. 1 and 2, the torque tube 17 extends between the driver's seat 12 and the passenger seat 13, and is connected to the engine 14 and the transaxle 15.

The hybrid electric vehicle 100 includes multiple exhaust pipes 29. The exhaust pipes 29 discharge exhaust gas of the engine 14 to the outside of the hybrid electric vehicle 100.

As shown in FIG. 1, one exhaust pipe 29 is disposed on each of the right and left sides of the hybrid electric vehicle 100. As shown in FIGS. 1 and 2, the exhaust pipes 29 are connected to the engine 14 at a position forward of the driver's seat 12 and the passenger seat 13, and extend to a position rearward of the transaxle 15.

As shown in FIG. 1, the transaxle 15 is disposed between the exhaust pipes 29 in the vehicle width direction. In FIG. 2, the horizontal long-dash short-dash line through the transaxle 15 indicates the center of the transaxle 15 in the height direction. As shown in FIG. 2, the exhaust pipes 29 are routed below the center of the transaxle 15 in the height direction.

Configuration of the Transaxle 15

FIG. 3 shows a structure of the transaxle 15 when the hybrid electric vehicle 100 is viewed from above. As shown in FIG. 3, the transaxle 15 includes a motor-generator 21, a speed change mechanism 22, and a differential gear 24.

As described with reference to FIGS. 1 and 2, the propeller shaft 16 connects the engine 14 to the transaxle 15. The speed change mechanism 22 is connected to the engine 14 via the propeller shaft 16.

The speed change mechanism 22 changes the speed of the rotation transmitted from the engine 14 to the speed change mechanism 22 through the propeller shaft 16. For example, the speed change mechanism 22 includes multiple planetary gear mechanisms that define multiple gear stages having different gear ratios. The speed change mechanism 22 is capable of changing the gear ratio by switching the gear stages.

The manner in which the speed change mechanism 22 changes the speed of the rotation from the propeller shaft 16 is not limited to the manner described above. For example, the speed change mechanism 22 may include two conical pulleys and a belt looped over the pulleys. The speed change mechanism 22 changes the speed of the rotation from the propeller shaft 16 by using the difference in circumferential length between the two pulleys. The speed change mechanism 22 can change the gear ratio by changing the effective radius of each pulley where the belt is looped.

As shown in FIG. 3, the speed change mechanism 22 is connected to a transmission mechanism 23. The transmission mechanism 23 transmits the rotation transmitted from the speed change mechanism 22 to a differential gear 24.

The transmission mechanism 23 transmits rotation from the speed change mechanism 22 in the direction of arrows in FIG. 3. For example, the transmission mechanism 23 is provided with multiple gears along the dashed arrow in FIG. 3 so that the rotation is transmitted in the direction of the dashed arrow. In the transmission mechanism 23, for example, a shaft or multiple gears are installed along the solid arrow in FIG. 3, so that the rotation transmitted in the direction of the dashed arrow is transmitted in the direction of the solid arrow.

As shown in FIG. 3, the differential gear 24 is connected to drive shafts 20. As shown in FIG. 1, the drive shafts 20 are respectively connected to right and left rear wheels 11. The differential gear 24 transmits the rotation transmitted from the transmission mechanism 23 to the right and left rear wheels 11 through the drive shafts 20. The differential gear 24 distributes the rotation transmitted to the right and left rear wheels 11 in accordance with the movement of the hybrid electric vehicle 100.

As described above, the rotation output of the engine 14 is transmitted to the rear wheels 11 through the speed change mechanism 22, the transmission mechanism 23, the differential gear 24, and the drive shafts 20.

In the motor-generator 21 shown in FIG. 3, sections indicated by dashed lines represent the internal structure of the motor-generator 21. As shown in FIG. 3, the motor-generator 21 includes a rotor 26 having magnets, and a stator 25 disposed to surround the rotor 26. The rotor 26 is connected to the propeller shaft 16.

The motor-generator 21 assists the rotation output of the engine 14. The motor-generator 21 rotates the rotor 26 together with the propeller shaft 16 by supplying electricity to the stator 25. When the rotor 26 rotates together with the propeller shaft 16, rotation output of the engine 14 transmitted to the speed change mechanism 22 through the propeller shaft 16 is increased.

The motor-generator 21 is also capable of generating power by using the rotation output of the engine 14. The motor-generator 21 is capable of generating power when the rotor 26 rotates as the propeller shaft 16 is rotated by the engine 14.

As shown in FIG. 3, the motor-generator 21 is connected to the propeller shaft 16 at a position forward of the speed change mechanism 22. As shown in FIGS. 1 and 2, the motor-generator 21 is disposed between the engine 14 and the speed change mechanism 22 in the vehicle longitudinal direction. Specifically, the motor-generator 21 is connected to the propeller shaft 16 at a position between the engine 14 and the speed change mechanism 22 in the vehicle longitudinal direction.

As shown in FIG. 3, a first clutch 27 is provided in a portion of the propeller shaft 16 between the engine 14 and the motor-generator 21. The first clutch 27 is capable of selectively connecting or disconnecting the portion of the propeller shaft 16 between the engine 14 and the motor-generator 21. When the first clutch 27 disconnects the engine 14 from the motor-generator 21, the rotation of the rotor 26 by the motor-generator 21 allows the rear wheels 11 to be driven by the driving force of the motor-generator 21 independently of the operation of the engine 14.

As shown in FIG. 3, a second clutch 28 is provided in a portion of the propeller shaft 16 between the motor-generator 21 and the speed change mechanism 22. The second clutch 28 is capable of selectively connecting or disconnecting the portion of the propeller shaft 16 between the motor-generator 21 and the speed change mechanism 22.

Arrangement of the Devices Above the Transaxle 15

As shown in FIGS. 1 and 2, the hybrid electric vehicle 100 includes a main battery 18. The main battery 18 stores electricity. For example, the main battery 18 stores electricity generated by the motor-generator 21. The main battery 18 supplies the stored electricity to the motor-generator 21. The motor-generator 21 rotates the rotor 26 by supplying electricity supplied from the main battery 18 to the stator 25.

The hybrid electric vehicle 100 includes a power control unit 19. As shown in FIG. 2, the power control unit 19 is disposed above the transaxle 15 and below the main battery 18. In FIG. 1, the main battery 18 disposed on the power control unit 19 is indicated by a long-dash double-short-dash line.

The power control unit 19 is capable of converting power. The main battery 18 stores DC electricity. The power control unit 19 converts DC power stored in the main battery 18 into AC power and supplies the AC power to the motor-generator 21. The power control unit 19 may convert AC power generated by the motor-generator 21 into DC power and supply the DC power to the main battery 18.

The power control unit 19 is capable of raising the voltage of electricity. The power control unit 19 raises the voltage of the electricity stored in the main battery 18 and supplies the electricity to the motor-generator 21.

In FIG. 1, portions of the respective devices disposed immediately below the power control unit 19 are indicated by dashed lines.

Structures of the Exhaust Pipes 29 and a Cooling Circuit 41

FIG. 4 shows the transaxle 15, the exhaust pipes 29, and the cooling circuit 41.

As shown in FIG. 2, the power control unit 19 is disposed above the transaxle 15, the exhaust pipes 29, and a speed change mechanism oil cooler 30. In FIG. 4, the power control unit 19 is indicated by a long-dash double-short-dash line. Portions of the respective devices disposed immediately below the power control unit 19 are indicated by solid lines.

As shown in FIG. 4, each of the right and left exhaust pipes 29 includes a muffler 32 and a valve 34.

The mufflers 32 suppress noise generated when the exhaust gas of the engine 14 is discharged to the outside of the hybrid electric vehicle 100.

The valves 34 are opened and closed, for example, in response to a switch operation by the driver. The valves 34 do not allow exhaust gas to flow therethrough in a closed state. When the valves 34 are opened in response to a switch operation by the driver, exhaust gas flows through the valves 34.

The hybrid electric vehicle 100 includes the cooling circuit 41. As shown in FIG. 4, the cooling circuit 41 is disposed near the transaxle 15. The cooling circuit 41 is disposed rearward of the driver's seat 12 and the passenger seat 13.

The cooling circuit 41 includes coolant piping 38, an oil cooler, oil piping, a radiator 33, a reservoir 35, and a water pump 37.

Coolant flows through the coolant piping 38. In FIG. 4, the direction in which coolant in the coolant piping 38 flows is indicated by arrows.

The cooling circuit 41 includes multiple oil pipes, i.e., speed change mechanism oil piping 39 and differential gear oil piping 40. Oil flows through the oil piping. In FIG. 4, the directions in which the oil in the oil piping flows are indicated by arrows.

The water pump 37 circulates coolant in the coolant piping 38. As shown in FIG. 4, the coolant piping 38 connects the water pump 37 to the power control unit 19. Accordingly, coolant discharged from the water pump 37 flows through the power control unit 19.

As shown in FIG. 4, the coolant piping 38 connects the power control unit 19 to the speed change mechanism oil cooler 30. Therefore, the coolant that has flowed through the power control unit 19 next flows through the speed change mechanism oil cooler 30.

Oil flows through the speed change mechanism 22. The speed change mechanism 22 and the speed change mechanism oil cooler 30 are connected through the speed change mechanism oil piping 39. The oil that flows through the speed change mechanism 22 flows through the speed change mechanism oil piping 39. The speed change mechanism oil cooler 30 exchanges heat between the oil flowing through the speed change mechanism 22 and the coolant.

As shown in FIG. 4, the oil flowing through the speed change mechanism oil piping 39 circulates between the speed change mechanism 22 and the speed change mechanism oil cooler 30. The cooling circuit 41 regulates the temperature of the speed change mechanism 22 by using oil that has undergone heat exchange with the coolant in the speed change mechanism oil cooler 30.

As shown in FIG. 4, the speed change mechanism oil piping 39 is provided with a thermostat valve 36. The thermostat valve 36 blocks the speed change mechanism oil piping 39 while the temperature of the oil flowing through the speed change mechanism oil piping 39 is relatively low. The thermostat valve 36 opens the speed change mechanism oil piping 39 when the temperature of the oil flowing through the speed change mechanism oil piping 39 is relatively high.

As shown in FIGS. 1 and 4, the speed change mechanism oil cooler 30 is disposed to the right of the transaxle 15. In FIG. 2, the speed change mechanism oil cooler 30, which is disposed to the right of the transaxle 15, is indicated by a dashed line. As shown in FIG. 2, the speed change mechanism oil cooler 30 is disposed above the exhaust pipes 29 and below the main battery 18.

As shown in FIG. 4, the coolant piping 38 connects the speed change mechanism oil cooler 30 to the differential gear oil cooler 31. Accordingly, coolant that has flowed through the speed change mechanism oil cooler 30 next flows through the differential gear oil cooler 31.

Oil flows through the differential gear 24. The differential gear 24 and the differential gear oil cooler 31 are connected to each other through the differential gear oil piping 40. Oil that flows through the differential gear 24 flows through the differential gear oil piping 40. The differential gear oil cooler 31 exchanges heat between the oil flowing through the differential gear 24 and the coolant.

As shown in FIG. 4, the oil flowing through the differential gear oil piping 40 circulates between the differential gear 24 and the differential gear oil cooler 31. The cooling circuit 41 regulates the temperature of the differential gear 24 by using oil that has undergone heat exchange with the coolant in the differential gear oil cooler 31.

In this manner, the cooling circuit 41 regulates the temperature of the transaxle 15 by using oil that has undergone heat exchange with the coolant in the speed change mechanism oil cooler 30 and the differential gear oil cooler 31.

As shown in FIG. 4, the coolant piping 38 connects the differential gear oil cooler 31 to the left radiator 33. Accordingly, the coolant that has flowed through the differential gear oil cooler 31 then flows through the left radiator 33. The radiator 33 cools the coolant.

As shown in FIG. 4, the coolant piping 38 connects the left radiator 33 to the right radiator 33. Accordingly, coolant that has flowed through the left radiator 33 next flows through the right radiator 33. In this manner, the coolant flowing through the cooling circuit 41 is cooled by flowing through the left radiator 33 and the right radiator 33.

As shown in FIG. 4, the coolant piping 38 connects the right radiator 33 to the reservoir 35. Accordingly, the coolant that has flowed through the right radiator 33 next flows through the reservoir 35. The reservoir 35 temporarily stores the coolant.

As shown in FIG. 4, the coolant piping 38 connects the reservoir 35 to the water pump 37. Accordingly, the coolant that has flowed through the reservoir 35 then flows through the water pump 37. In this manner, the coolant within the coolant piping 38 completes one circulation loop through the cooling circuit 41.

As shown in FIG. 4, for example, a portion of the coolant piping 38 that connects the left radiator 33 to the right radiator 33 and a portion of the coolant piping 38 that connects the reservoir 35 to the water pump 37 are routed above the exhaust pipes 29. In this manner, the coolant piping 38 is routed above the exhaust pipes 29.

Operation of the Present Embodiment

In a rear-wheel drive vehicle, traction is readily achieved when a heavy object is arranged in the rear portion of the vehicle. In the hybrid electric vehicle 100, the transaxle 15 is a heavy object. The transaxle 15 is disposed rearward of the driver's seat 12 and the passenger seat 13. Accordingly, the weight of the rear portion of the hybrid electric vehicle 100 increases, so that traction is readily achieved in the hybrid electric vehicle 100.

The coolant piping 38, which is routed above the exhaust pipes 29, receives heat from the exhaust pipes 29. Therefore, the hybrid electric vehicle 100 can rapidly warm the coolant flowing through the cooling circuit 41 after the start of operation. As a result, the hybrid electric vehicle 100 can efficiently warm up devices that exchange heat with the cooling circuit 41.

Advantages of the Present Embodiment (1) The above-described hybrid electric vehicle 100 achieves both weight distribution that facilitates traction and efficient warm-up of the devices mounted on the vehicle 100.

(2) The main battery 18, which stores electricity and supplies the stored electricity to the motor-generator 21, is disposed above the transaxle 15.

The power storage capacity of the main battery 18 decreases as the temperature increases. Therefore, it is desirable to dispose the main battery 18 at a position where the main battery 18 is less likely to receive heat from the exhaust pipes 29. In the above-described hybrid electric vehicle 100, the main battery 18 is disposed above the transaxle 15. This arrangement increases the distance between the main battery 18 and the exhaust pipes 29. This arrangement suppresses heat transfer from the exhaust pipes 29 to the main battery 18.

(3) The exhaust pipes 29 are routed below the center of the transaxle 15 in the height direction.

The exhaust pipes 29 are arranged with respect to the transaxle 15 to maximize the distance between the main battery 18 and the exhaust pipes 29. This arrangement further suppresses heat transfer from the exhaust pipes 29 to the main battery 18.

(4) The above-described hybrid electric vehicle 100 includes the power control unit 19, which converts the power in the main battery 18, raises the voltage of the power, and supplies the power to the motor-generator 21. The power control unit 19 is disposed above the transaxle 15 and below the main battery 18.

Since the power control unit 19 is disposed below the main battery 18, the distance between the main battery 18 and the exhaust pipes 29 is increased. This arrangement further suppresses heat transfer from the exhaust pipes 29 to the main battery 18.

(5) The cooling circuit 41 includes the speed change mechanism oil cooler 30, which exchanges heat between the oil flowing through the speed change mechanism 22 and the coolant. The cooling circuit 41 includes the speed change mechanism oil piping 39, which connects the speed change mechanism oil cooler 30 and the speed change mechanism 22. The speed change mechanism oil cooler 30 is disposed above the multiple exhaust pipes 29 and below the main battery 18.

The speed change mechanism oil cooler 30 is disposed between the main battery 18 and the exhaust pipes 29. Therefore, the heat from the exhaust pipes 29 is absorbed by the oil flowing through the speed change mechanism oil cooler 30, which is located between the main battery 18 and the exhaust pipes 29. Accordingly, it is possible to further suppress heat transfer from the exhaust pipes 29 to the main battery 18.

Modifications

The above-described embodiment may be modified as follows. The above-described embodiment and the following modifications can be combined if the combined modifications remain technically consistent with each other.

In the above-described hybrid electric vehicle 100, as shown in FIG. 1, the driver's seat 12 is disposed on the left side in FIG. 1, and the passenger seat 13 is disposed on the right side in FIG. 1. The arrangement of the driver's seat 12 and the passenger seat 13 may be reversed.

As described with reference to FIG. 3, the rotation output of the engine 14 is transmitted through the speed change mechanism 22, the transmission mechanism 23, the differential gear 24, and the drive shafts 20, in that order to the rear wheels 11. However, the manner in which the rotation output of the engine 14 is transmitted to the rear wheels 11 is not limited to the above-described embodiment. For example, when the drive shafts 20 are disposed rearward of the speed change mechanism 22, the hybrid electric vehicle 100 does not necessarily need to include the transmission mechanism 23.

The above-described hybrid electric vehicle 100 includes the first clutch 27 and the second clutch 28. The hybrid electric vehicle 100 may be configured without either the first clutch 27, the second clutch 28, or both.

The above-described hybrid electric vehicle 100 includes two exhaust pipes 29. The hybrid electric vehicle 100 may include three or more exhaust pipes 29.

The speed change mechanism oil cooler 30 is disposed to the right of the transaxle 15. The speed change mechanism oil cooler 30 may be disposed to the left of the transaxle 15.

The structure of the cooling circuit 41 is not limited to the above-described embodiment.

The types and number of devices included in the cooling circuit 41 are not limited to those in the above-described embodiment. For example, the cooling circuit 41 may include only one radiator 33.

The manner in which the coolant piping 38 and the oil piping connect the devices to each other is not limited to the above-described embodiment. For example, the coolant piping 38 may directly connect the water pump 37 and the speed change mechanism oil cooler 30.

The main battery 18 is disposed above the transaxle 15. However, the location where the main battery 18 is disposed is not limited to the above-described embodiment. For example, the main battery 18 may be disposed below the transaxle 15.

The exhaust pipes 29 are disposed below the center of the transaxle 15 in the height direction. However, the location where the exhaust pipes 29 are disposed is not limited to the above-described embodiment. For example, the exhaust pipes 29 may be disposed above the center of the transaxle 15 in the height direction.

The above-described hybrid electric vehicle 100 includes the power control unit 19. The hybrid electric vehicle 100 does not necessarily need to include the power control unit 19.

The power control unit 19 is disposed above the transaxle 15 and below the main battery 18. However, the location where the power control unit 19 is disposed is not limited to the above-described embodiment. For example, the power control unit 19 may be disposed below the transaxle 15. Further, for example, the power control unit 19 may be disposed above the main battery 18.

The speed change mechanism oil cooler 30 is disposed above the exhaust pipes 29 and below the main battery 18. However, the location where the speed change mechanism oil cooler 30 is disposed is not limited to the above-described embodiment. The speed change mechanism oil cooler 30 may be disposed, for example, below the exhaust pipes 29. Further, the speed change mechanism oil cooler 30 may be disposed, for example, above the main battery 18.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuitry are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A hybrid electric vehicle, comprising:

an engine;

a transaxle including:

a motor-generator configured to assist a rotation output of the engine;

a speed change mechanism configured to change a speed of rotation transmitted from the engine; and a differential gear configured to distribute the rotation to right and left rear wheels, the speed of the rotation having been changed by the speed change mechanism;

a cooling circuit including coolant piping through which coolant flows, the cooling circuit being configured to regulate a temperature of the transaxle;

multiple exhaust pipes configured to discharge exhaust gas of the engine to outside; and a driver's seat and a passenger seat, wherein the engine is disposed forward of the driver's seat and the passenger seat, the exhaust pipes are connected to the engine at a position forward of the driver's seat and the passenger seat, and extend to a position rearward of the transaxle, the transaxle is disposed rearward of the driver's seat and the passenger seat and between the exhaust pipes in a vehicle width direction, the cooling circuit is disposed rearward of the driver's seat and the passenger seat, and the coolant piping is routed above the exhaust pipes.

2. The hybrid electric vehicle according to claim 1, further comprising a main battery configured to store electricity and supply the stored electricity to the motor-generator, wherein the main battery is disposed above the transaxle.

3. The hybrid electric vehicle according to claim 2, wherein the exhaust pipes are routed below a center of the transaxle in a height direction.

4. The hybrid electric vehicle according to claim 2, further comprising a power control unit configured to convert power in the main battery, raise a voltage of the power, and supply the power to the motor-generator, wherein the power control unit is disposed above the transaxle and below the main battery.

5. The hybrid electric vehicle according to claim 2, wherein the cooling circuit includes:

an oil cooler configured to perform heat exchange between oil flowing through the speed change mechanism and the coolant; and an oil piping through which oil flows, the oil piping connecting the oil cooler to the speed change mechanism, and the oil cooler is disposed above the exhaust pipes and below the main battery.

6. The hybrid electric vehicle according to claim 1, wherein each of the exhaust pipes is connected to the engine at the position forward of the driver's seat and the passenger seat, and extend to the position rearward of the transaxle.

7. The hybrid electric vehicle according to claim 1, wherein the multiple exhaust pipes include an exhaust pipe disposed on the right side of the vehicle and an exhaust pipe disposed on the left side of the vehicle.

8. The hybrid electric vehicle according to claim 1, wherein the transaxle overlaps with the multiple exhaust pipes in the width direction.

9. The hybrid electric vehicle according to claim 1, further comprising a propeller shaft that extends from a position forward of the driver's seat and the passenger seat to a position rearward of the driver's seat and the passenger seat, wherein the propeller shaft connects the engine to the transaxle and transmits rotation output of the engine to the transaxle.

* * * * *